United States Patent
Lundgren

(10) Patent No.: US 12,128,417 B2
(45) Date of Patent: Oct. 29, 2024

(54) ONE-PASS DRY GRAIN AND CORN FRACTIONATION

(71) Applicant: Librixer AB, Gothenburg (SE)

(72) Inventor: Eric L. Lundgren, Västra Frölunda (SE)

(73) Assignee: Librixer AB, Mölndal (SE)

( * ) Notice: Subject to any disclaimer, the term of this patent is extended or adjusted under 35 U.S.C. 154(b) by 342 days.

(21) Appl. No.: 17/632,484

(22) PCT Filed: Jul. 28, 2020

(86) PCT No.: PCT/EP2020/071194
§ 371 (c)(1),
(2) Date: Feb. 2, 2022

(87) PCT Pub. No.: WO2021/023565
PCT Pub. Date: Feb. 11, 2021

(65) Prior Publication Data
US 2022/0280949 A1    Sep. 8, 2022

Related U.S. Application Data

(60) Provisional application No. 62/882,683, filed on Aug. 5, 2019.

(51) Int. Cl.
*B02C 13/18* (2006.01)
*B02C 13/14* (2006.01)

(52) U.S. Cl.
CPC ........ *B02C 13/18* (2013.01); *B02C 2013/145* (2013.01)

(58) Field of Classification Search
CPC .... B02C 9/00; B02C 9/02; B02C 9/04; B02C 13/18; B02C 13/14; B02C 2013/145; B02C 23/14
See application file for complete search history.

(56) References Cited

U.S. PATENT DOCUMENTS 2,762,572 A * 9/1956 Lykken ................ B02C 19/005
                                                       241/49
3,204,882 A    7/1965 Vifian et al.
(Continued)

FOREIGN PATENT DOCUMENTS

DE    4200827 A1 * 7/1993 ............. B02C 13/14
DE    10132689 A1 * 1/2003 ............. B02C 13/14
(Continued)

*Primary Examiner* — Faye Francis
(74) *Attorney, Agent, or Firm* — Macheledt Bales LLP; Jennifer L. Bales

(57) ABSTRACT

A dry, one pass processing method for obtaining pre-process liberated fractions from a corn or other cereal kernel, including moisturizing (S1) the corn bran layer by a mist of small droplets of water, comminuting (S2) the corn kernel with a comminution reactor having a spinnable shaft and two or more processing chambers, separated by segmented plates, wherein each processing chamber comprises one rotor discs attached to the shaft and one or more vortex generators placed in a side wall apex corner of the processing chambers, wherein the corn kernel is fed into the comminution reactor and small and large bran sections, whole and broken germ, soft endosperm, and medium and large hard endosperm fractions are liberated from the corn kernel by means of a chaotic non-linear flow of the corn kernel and the liberated products generated in the processing chambers.

24 Claims, 7 Drawing Sheets

(56) References Cited

U.S. PATENT DOCUMENTS

| | | | | |
|---|---|---|---|---|
| 3,979,375 | A * | 9/1976 | Rao | A23J 1/12 |
| | | | | 426/507 |
| 3,981,454 | A | 9/1976 | Williams | |
| 6,372,281 | B1 * | 4/2002 | Metzger | B02C 9/04 |
| | | | | 426/481 |
| 6,405,948 | B1 | 6/2002 | Hahn et al. | |
| 8,227,012 | B2 * | 7/2012 | DeLine | C12P 7/06 |
| | | | | 426/429 |
| 2004/0258814 | A1 * | 12/2004 | VanHouten | B02C 9/04 |
| | | | | 426/481 |
| 2010/0059609 | A1 * | 3/2010 | Teeter, Jr. | B02C 9/04 |
| | | | | 241/11 |
| 2012/0107475 | A1 * | 5/2012 | Kolb | B02C 9/00 |
| | | | | 426/507 |
| 2013/0126647 | A1 | 5/2013 | Arnold et al. | |
| 2017/0252751 | A1 * | 9/2017 | Ebels | B02C 13/14 |

FOREIGN PATENT DOCUMENTS

| | | | | |
|---|---|---|---|---|
| EP | 0852911 | | 11/1999 | |
| EP | 3213820 | | 6/2017 | |
| GB | 1165250 | | 5/1953 | |
| KR | 20070014453 | A * | 2/2007 | B02C 9/02 |
| WO | WO-2004093549 | A2 * | 11/2004 | B02B 1/00 |
| WO | 2019/023647 | | 1/2019 | |

* cited by examiner

ONE-PASS DRY GRAIN AND CORN FRACTIONATION

CROSS-REFERENCE TO RELATED APPLICATIONS

The present application claims the benefit of the filing date of U.S. pat. app. No. 62/882,683 (filed 5 Aug. 2019) and claims priority to PCT/EP2020/071194 (filed 28 Jul. 2020).

TECHNICAL FIELD

The present disclosure relates to dry fractionation of corn and other starch bearing grains resulting in liberation of common cereal components, such as starch, protein, fiber, and fat prior to processes such as ethanol production or beer fermentation. In particular, the disclosure relates to the use of a system called the Librixer system, which is arranged for both liberation and micronization, wherein the components are liberated from each other along natural boundaries and simultaneously are grinded smaller.

BACKGROUND

The basic components of corn kernels are bran and tip cap (containing almost all fiber of the kernel), endosperm (containing the starch in two different forms; the soft endosperm and the hard endosperm) and the germ which contains some fiber and almost all of the fat/oil. The tip cap is the outer shell membrane that prior connected the kernel to the husk. The bran is the fibrous membrane surrounding the entire kernel. The two different kinds of endosperm are composed of starch bodies, held together by different proteins that form the major portion of the kernel. The germ contains the fat within the kernel. Corn comes in several varieties each defined by its typical or average composition of endosperm, germ, tip cap and bran fractions.

Other grain seeds such as wheat, rye, rice, sorghum and similar have somewhat different compositions of starch, fibers, and fats. In many situations it is of distinct benefit to be able to liberate and remove fibers and fat from the starch prior to a main refinement process such as ethanol production or beer fermentation. There are many known technologies and processes utilized today for this purpose. Known milling techniques and apparatus, such as roller, hammer, and ball mills, are generally based on either impact, shear or compression forces or a combination thereof. These forces mimic what nature has done for millions of years. A typical example of a natural milling process is a river gradually breaking down riverbed rocks to finer granules or sand. Nature, as well as traditional milling techniques, tend to create variably sized round particles with passive surfaces. Biological materials such as cell structures are broken, and its interiors spilled and exposed to degradation.

There is a need for improved methods for pre-process fractionation of corn and other starch bearing grains.

SUMMARY

It is an object of the proposed technique to provide improved methods for fractionation of corn and other starch bearing grains. This object is obtained by a dry, one pass processing method for obtaining pre-processing liberated fractions from a corn or other cereal kernel. The method comprises moisturizing the corn bran layer by a mist of droplets of water, followed by comminuting the corn kernel by a comminution reactor comprising a spinnable shaft and two or more processing chambers, separated by segmented plates, wherein each processing chamber comprises a rotor disc attached to the shaft and one or more vortex generators placed in a side wall apex corner of the processing chamber. The corn kernel is fed into the comminution reactor and small and large bran particles, whole and broken germ, soft endosperm flour, and medium and large hard endosperm particles are liberated from the corn kernel by means of a chaotic vortex flow of the corn kernel and the liberated products generated in the processing chambers.

The uniqueness of the methods and devices presented herein is that the same fractionation result as achieved by the river discussed above can be accomplished dry for different cereals. The components, such as fibers, starch and fat in the seeds are liberated along natural boundaries established by nature. For example, the germ common for all such seeds can be liberated and concentrated with high purity. Thereby a majority of the fat can be removed prior to downstream processes being ethanol conversion, beer production, baking, or the like. In neither such process is the fat needed. Instead it hinders efficiency and valuable resources are rendered worthless.

The methods disclosed herein also allow extraction of valuable Zein protein which has been liberated during micronization of the fluffy endosperm. The total volume of the different varieties of Zein may be approximately 3% of the total weight of the kernel. Zein protein is not consumed by, e.g., ethanol production processes and will eventually end up in the spent grain to be sold as, e.g., animal feed. By pre-fractionation, separation, and extraction of Zein its value can be increased between 200 and 1,000 times and instead of being a nuisance and a general hindrance in a low profitable ethanol production become the most profitable phase of the Ethanol production when compared with the ethanol value.

According to aspects, the method further comprises separating the bran from the liberated products using an air aspirator. The bran represents a significant volume with very low weight. A removal of the liberated or separated bran will simplify further down-stream separation and concentration of the other components of the kernel in the processing chain.

According to aspects, the method also comprises dividing the remaining liberated components, after the separation of the bran, into large size, medium size, and fine particles based on their relative size. Thus, different fractions can be separated. The dividing may for instance be achieved with a sieve screen or a shaker screen. The relative size of the particles may be selected such that the fine particles comprise the soft or fluffy endosperm. The relative size may also be selected such that the medium size particles comprise the medium sized hard endosperm and broken or smaller sized germ, and such that the large size particles comprise the large pieces of hard endosperm and whole germ.

According to aspects, the medium sized hard endosperm and small or broken germ are separated from each other based on their density.

According to aspects, small sized bran pieces and the tip caps is separated from the large sized hard endosperm and whole germ by an air aspirator.

According to aspects, the separated large sized hard endosperm and whole germ are separated from each other based on their density.

According to aspects, the water used for moisturizing the bran of the cereal grain is either tap water or analyte water. The smaller water clusters from analyte water will quickly wet the bran or "skin" without injecting any further moisture into the seed or kernel itself, which is an advantage. Using analyte water will further safeguard the down-stream process from common surface bacteria and mold. It is, however, an advantage that the proposed methods also work with tap water.

According to aspects, the method further comprises a mixing of the earlier kinds of corn endosperms separated by size for a high starch content mash where the small and large bran flakes, and the whole and broken germ have been removed. The mixing comprises grinding the separated medium sized hard endosperm, the large sized hard endosperm, and the soft endosperm together in the comminution reactor into the high starch content mash of suitable size for enzymatic conversion of starch to sucrose. The starch in the high starch content mash may then be converted into sucrose using enzymes for starch to sucrose conversion. Thus, the converted high starch content mash may be converted into ethanol in an efficient and robust manner.

According to other aspects, the method further comprises a mixing for a high cellulose content mash where the whole and broken germ, soft endosperm, and medium and large hard endosperm have been removed. The mixing comprises grinding the separated small bran and large bran together in the comminution reactor into the high cellulose content fiber flour. The cellulose in the high cellulose content flour may then be converted into sucrose using enzymes for cellulose to sucrose conversion. Thus, the converted high cellulose content may be converted into ethanol in a cost-efficient and effective manner.

According to further aspects the converted high starch content mash and the converted high cellulose content flour is combined and converted into ethanol.

According to yet further aspects, the method further comprises and offer an alternative to enzymatic conversion of fiber to sucrose by offering a mixing for a spent grain feed mash, the mixing comprises grinding the separated small bran and large bran together with a syrup extracted as a bi-product from later stages in ethanol production, and together with spent grain in the comminution reactor into the spent grain mash for animal feed.

The comminution reactor used for the above methods may comprise between 2 and 10 processing chambers, and preferably 6 processing chambers. This range of processing chambers have been found particularly suitable for the disclosed processing examples. The size of each processing chamber and its respective rotor disc may be between 13-38 inches, and preferably 21 inches in diameter. A processing chamber optionally comprises 9 omega vortex generators, and the rotor disc may be configured to rotate at about 1550 revolutions per minute. These settings and configurations have been shown to yield good results for the herein disclosed applications. A feed rate of corn kernels into the comminution reactor may be between 1 and 5 metric tons of corn per hour.

There is also disclosed herein apparatus and systems associated with the above-mentioned advantages and technical effects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the proposed technique will become apparent when studying the appended claims and the following description. The skilled person realizes that different features of the proposed technique may be combined to create embodiments other than those described in the following, without departing from the scope of the proposed technique.

BRIEF DESCRIPTION OF THE DRAWINGS

The present disclosure will now be described in more detail with reference to the appended drawings, where.

DETAILED DESCRIPTION

Figure 1:
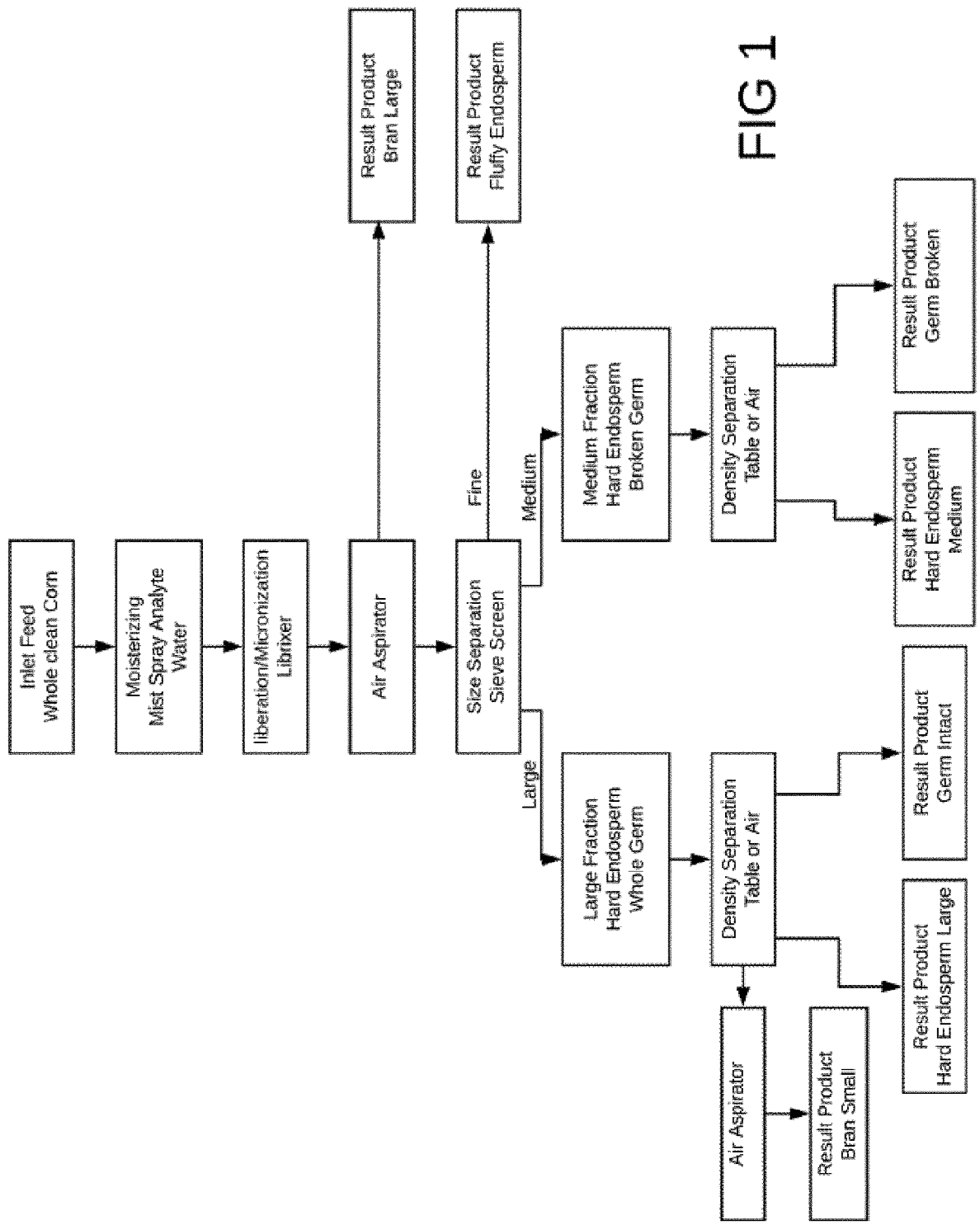
FIG. 1 is a schematic block diagram of some of the proposed techniques including the Librixer, feeding, moisturizing, an air aspirator for bran separation, sieve screening of different fractions based on size, and density separation of particles within each size fraction.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

The relative percentages of the different fractions vary significantly between different varieties of cereals as well as different varieties of corn. Certain corn for instance developed specifically for ethanol production hold approximate the following weight relations between the different fractions.

| | |
|---|---|
| Whole kernel | 100% |
| Endosperm | 80% |
| White or fluffy (40%) | |
| Yellow or hard (60%) | |
| Bran | 12% |
| Germ | 6% |
| Tip Cap | 2% |

By fractionating a cereal kernel, separate fractions can be created and used as a feed stock for various processes and products. For example, the bran fraction can be used as a separate source for ethanol production via special enzymes or used to fortify pet food, just to mention two of many. The endosperm fractions can both be used for ethanol production and the fluffy endosperm specifically be used for Zein protein extraction prior to ethanol conversion. The germ fraction is mainly further processed for its lipid content. It should be further noticed that fractionating and removal of bran and germ greatly improves performance and yield within ethanol production. For example, the bran tends to limit the dry content, starch bearing, volume for starch to sugar conversion and later in the process clog membranes, thereby making the refinement less cost-effective and more time consuming. There is no starch in the bran and therefore no reason to keep this fraction as a part of ethanol product unless these fibers via special enzymes are converted to sugar independently from the main process. The liberated and removed bran fraction can economically be kept separate from traditional ethanol production and then added back to the feed by-product either wetted or dry. The oil content of the germ often has a significant negative effect on the enzyme performance during the enzymatic hydrolysis of starch to glucose and if liberated and removed potentially could lower the consumption of enzymes and thereby eliminate a significant production cost associated with consumptions of enzymes. The oil which is completely inert for the ethanol process is also known to foam up in the ethanol process, which is a drawback.

The various methods of milling corn known to those skilled in the art can generally be divided into two primary processing categories, dry milling, and wet milling. Wet milling is generally regarded as a very effective technique for producing distinct process fractions of relatively high purity. This effectiveness is evident in the fact that the starch, the lipid, and fiber content in each of the fractions are very concentrated within its relative stream. While wet milling typically will yield higher purity fractionate fractions compared to dry milling, it also is comparatively more expensive than dry milling. Thus, most operations using wet milling are doing so because they need or require these distinct fractions as pure as possible. Wet milling could be or commonly is referred to as a "chemical" process.

Dry milling with traditional equipment on the other hand is less expensive but does not result in the same degree of liberation and separation between the different fractions, and therefore, does not provide the purity required for an optimized process. A consequence can be the loss or waste of portions of the fractionate, e.g., more germ in the bran fraction represents a potential loss of lipid values. Dry milling typically could be considered a "physical" process.

There is a need for a dry milling process for corn kernel fractionation that provides improved purity of process fractions from a wide array of reasons, and even more desirable to provide a dry milling process that can provide purity levels approaching those achievable with wet milling. Further it is desirable to provide a fractionation process that can yield mixed processed fractions of desired composition or degree of mixing for select operations.

It is an object of the present disclosure to provide methods and apparatus for dry fractionation of corn and other cereal kernels. The proposed technique provides dry milling fractionation processing of corn and other grains. In a method for fractionating corn according to an embodiment of the proposed technique, a feed of corn kernel is supplied to a special comminution apparatus, the Librixer, previously described by one of the inventors to this method. A similar device is described in EP2571620A2. The Librixer mill is a unique 360-degree mill that not only micronizes brittle materials but also liberates the components along natural boundaries. Nature, as well as traditional milling techniques, tend to create variably sized round particles with passive surfaces. Biological materials such as cell structures are broken, and its interiors spilled and exposed to degradation. The Librixer 360-degree comminutor is designed to liberate materials along natural boundaries while keeping the liberated structures relatively intact. Its operating results lends itself well to the task of liberating bran, germ, and the two kinds of endosperm in corn for example.

Herein, particle sizes are referred to using relative terms, such as small, medium, and large. It is appreciated that absolute size values can be determined by straight forward experimentation. In the present disclosure, relative sizes are deemed more appropriate in order to not obscure the general inventive concept.

Figure 6A:
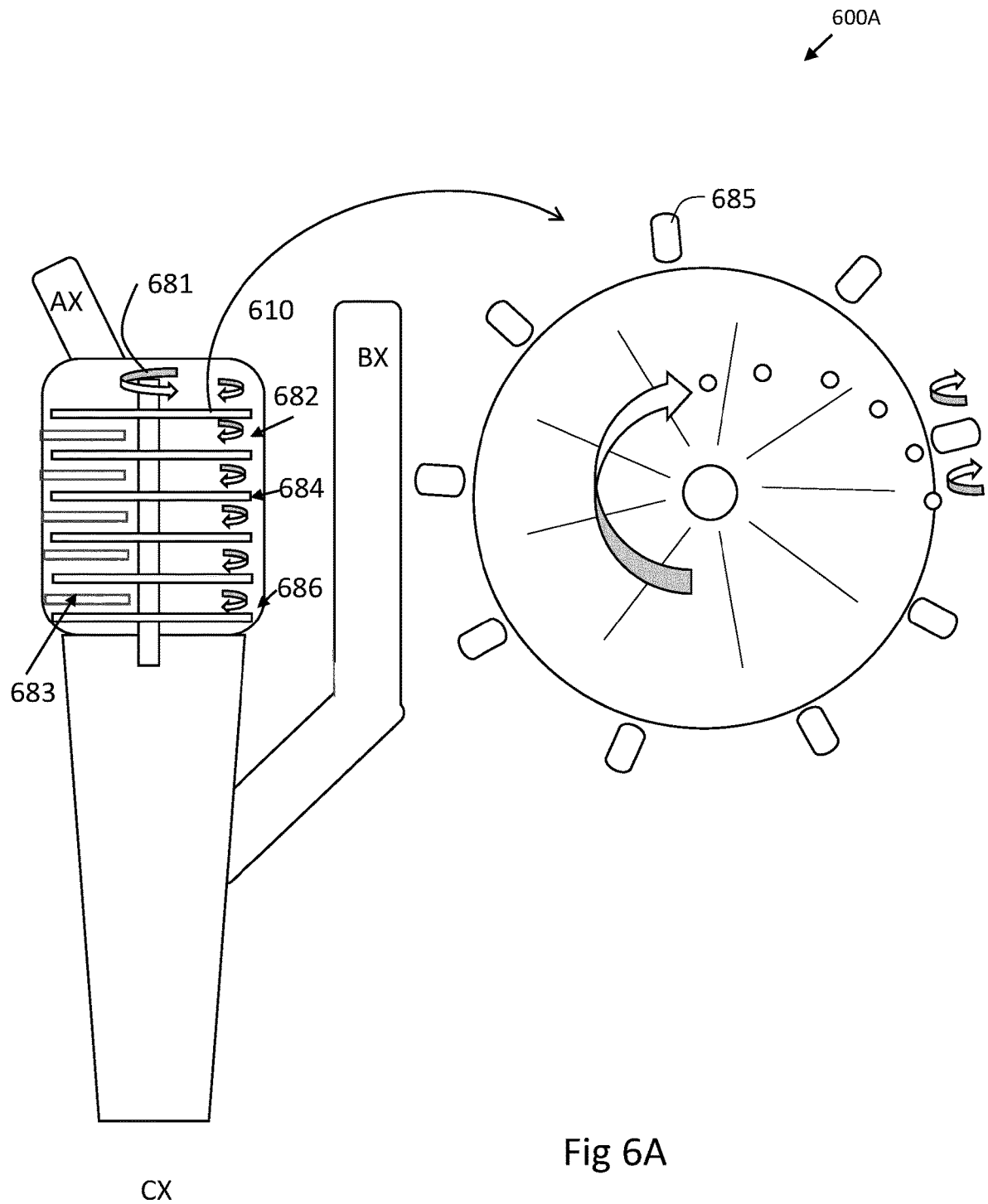
FIGS. 6A and 6B are schematic block diagrams illustrating general operating principles behind the Librixer system discussed herein.
Figure 6B:
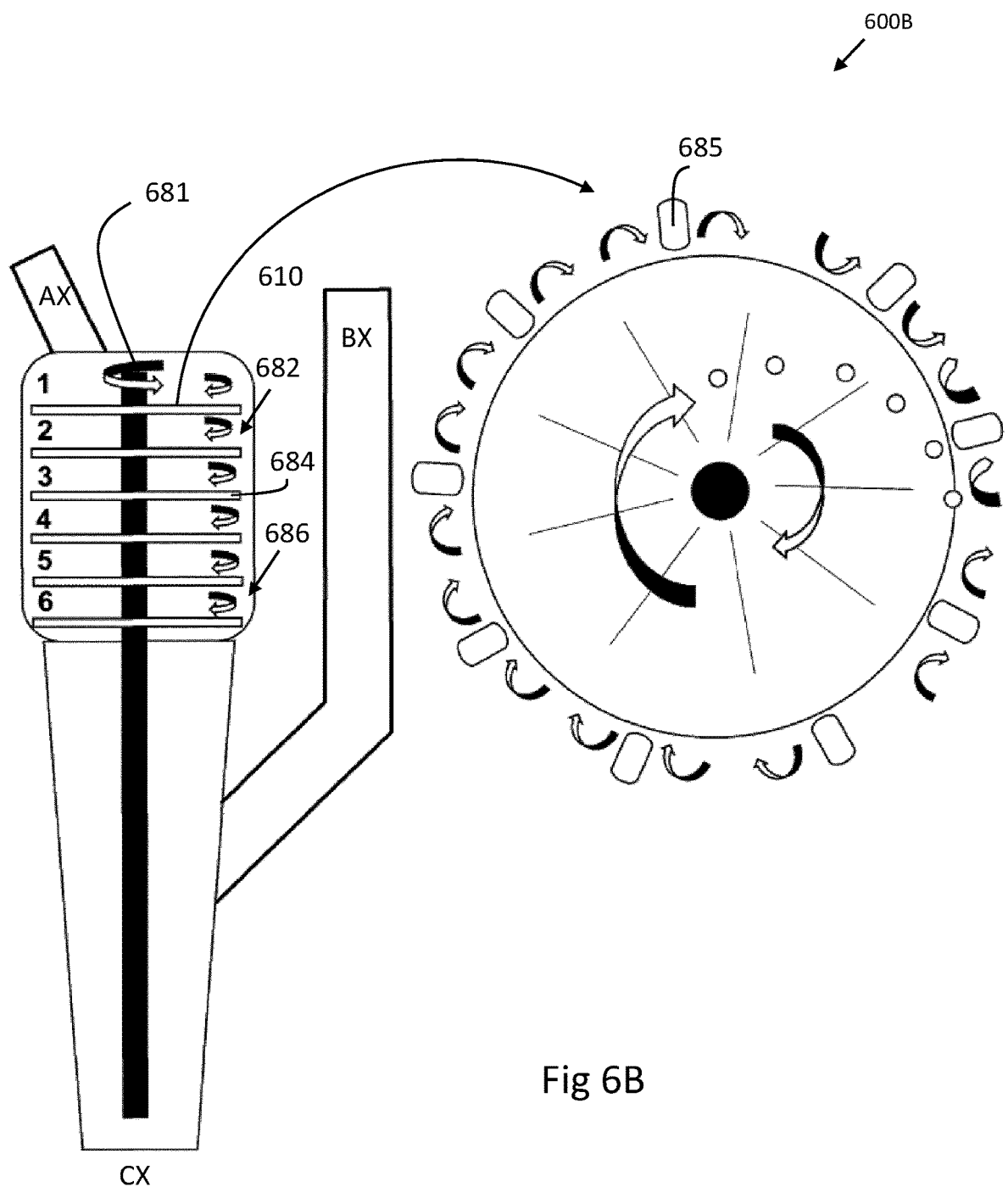

An example of the Librixer comminutor system is shown in FIGS. 6A and 6B, which will be discussed in more detail below.

The Librixer comminutor system has a number of operating parameters, comprising rotation direction (clockwise or counterclockwise), rotation speed, and feed rate expressed in volume per hour. Initially these operating parameters of the Librixer are set to optimize the finished result of the bran liberation, where larger sized pieces of the endosperms are preferable for a more simple and cleaner bran fraction separation, while not breaking the germ into smaller pieces making them harder to separate from each other and the rest of the material. With the Librixer operating parameters properly set almost all bran will be liberated intact as large flakes looking very much as "Fly Wings" at its own particle size distribution. A secondary consideration of operating parameters is that the soft "fluffy" endosperm is liberated from the hard endosperm and broken down to a finer flour-like substance. When this is carefully set, four "clean" liberated fractions of the comminution and liberation of the seed, in this case the corn, is achieved and ready for simple mechanical separation with the use of commonly known equipment.

The design of the rotor assembly, as the individual skilled in such art will realize, injects different levels of forces into the fluid stream consisting mostly of air and the processed product. One side of the vanes is convex and the other being concave. This results in different power requirements for rotation and interactions that are more violent and less violent with the fluid stream as it is processed within each stage in the Librixer.

The rotation speed depends on the number of process chambers and the actual physical size of each chamber. The Librixer can have anywhere from just a few process chambers upwards to 6 or more chambers. The actual size of each chamber and its rotor disc can vary from 13-15 inches upwards to 34-38 inches in diameter. For example, one such embodiment consisting of 6 process chamber and a physical size of 21 inches tested with genetically modified (GMO)

corn suitable for ethanol production resulted in a rotation speed of 1,550 rpm, representing an energy level suitable for a successful liberation of the bran while still keeping the germ, or at least a majority of the germs, intact. A higher amount of energy per volume based on either higher rpm or lower feed rate, would result in either lesser size bran; harder to separate later, or more destroyed germ; also harder to separate from the endosperm later.

Finally, the feed rate in volume per time unit will affect the end result where low feed rate tends to allocate larger energy per volume and most commonly generate smaller particles. One such feed rate with a 6 stage Librixer operating clockwise at 1,550 rpm has found to be 117 bushel per hour or around 3 metric tons of corn per hour.

Before entering the Librixer system each corn kernel is briefly moisturized with micro-droplets of clean water. It is preferred, for several reasons, to use sanitizing analyte water for this initial moisturization of the seed bran surface. The smaller water clusters from analyte water will quickly wet the bran or "skin" without injecting any further moisture into the seed or kernel itself. The added small amount of moisture is then efficiently removed, blown off, during the passage through the Librixer and the finished fractionated sed or corn will have the same moisture content as the original dry feed stock. Using analyte water will further safeguard the downstream process from common surface bacteria and mold. The misting of the feed stock is done within a short distance from the feed opening of the Librixer. This will allow the moisture time to only soften the thin outer layer, the bran, of the seed or corn kernel. The Librixer will also at the same time micronize and liberate each component of the corn kernel based on its own mechanical characteristic. The slightly softened bran will bend and flex during the liberation process inside the Librixer and come through as very large sheets of bran. A common size of this bran or skin is around 50% of the size of the seed or kernel and on many occasions even slightly larger. The appearance of the liberated bran is very close to the one of wings of a fly.

Figure 7:
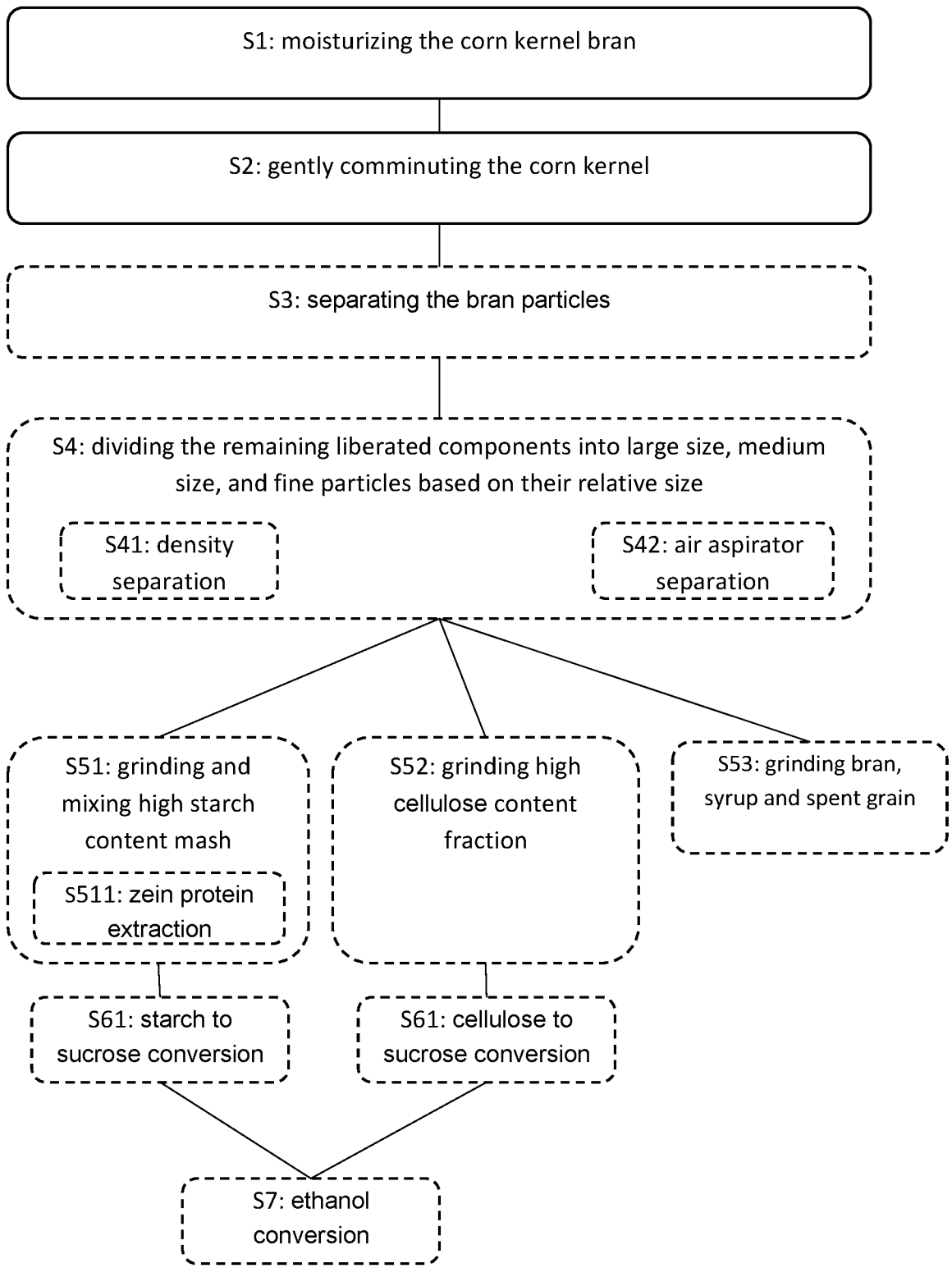
FIG. 7 is a flow chart illustrating methods.

Thus, with reference to FIG. 6A and FIG. 7, there is disclosed herein a dry, one pass processing method for obtaining pre-processing liberated fractions from a corn or other cereal kernel. The method comprises moisturizing S1 the corn bran layer by a mist of droplets of water, and also comminuting S2 the corn kernel by a comminution reactor 610 comprising a spinnable shaft 681 and two or more processing chambers 682, separated by segmented plates 683, wherein each processing chamber 682 comprises a rotor disc 684 attached to the shaft 681 and one or more vortex generators 685 placed in a side wall 686 apex corner of the processing chambers 682, wherein the corn kernel is fed into the comminution reactor 610 and small and large bran sections, whole and broken germ, soft endosperm, and medium and large hard endosperm fractions are liberated from the corn kernel by means of a chaotic vortex flow of the corn kernel and the liberated products generated in the processing chambers 682. Various aspects of the methods disclosed herein are set forth in the dependent claims, which are disclosed below in connection to FIG. 7.

For one GMO corn specifically designed for ethanol production a 15 second retention time or moisturizing time was deemed appropriate. The same test resulted in a feed rate of 3 tons per hour. These two process parameters were accomplished with a suitable grain screw feeder known in the art. The size and length of the feed screw were chosen so that the kernels where retained inside the grain screw for 15 seconds and that the rotation speed of the grain feeder was such that 3 tons was delivered every hour into the feed opening of the Librixer. It is, however, appreciated that other processes based on, e.., other types of corn, may be associated with other settings.

It is appreciated that, in some cases fluids other than water may be used to moisturize the corn bran layer.

In one experiment, the actual misting was accomplished with several micro nozzles attached to the bottom of the feed grain screw. The amount of water was set to a feed rate that provided an even wetting of each kernel without accumulation of water at the bottom of the grain elevator. Any additional water above just wetting the kernels could then drip of during their 15 seconds journey up the screw feeder tube. Several tests, to establish proper amount of water and retention time, were done where the kernels coming out from the top of the screw feeder were scraped to see if enough time had passed and enough water used for the bran to successfully be flaked off. At the same time the moisture levels of the kernel's interior were measured to make sure that a minimum of moisture had been added to the germ and endosperm. It may be important to keep the same moisture level inside the kernel since the soft endosperm preferably should keep its mechanical character. Another important reason to maintain proper moisture level is the optional down-stream mechanical size sorting. At the same time, the softer and more flexible germ will be liberated intact from the two endosperms. The less flexible endosperm, both the soft and fluffy are more brittle and tend to come free from the flexible germ via break down in size and the Librixer resonance forces focused on the boundaries between these components of the kernel. With the correct process parameters of the Librixer the soft endosperm and the hard endosperm are also liberated from each other. The soft endosperm is not really soft. Its protein or glue is just of a different character and the individually starch structures are liberated from each other and the protein. The hard endosperm reacts slightly different. Its glue is much stronger and of a different character. The result is slightly larger more granular pieces from the hard endosperm.

The liberation for the kernel's main components all occurs in one pass through the Librixer and within fractions of a 100's of a second inside the Librixer. It should be noted that all four liberated fractions are still mixed together after the process in the Librixer and need to be separated from each other into four clean fractions for further common or individual processes. Such separation can be accomplished by methods known in the art and are not necessarily part of the processes and methods disclosed herein using the Librixer.

The result of the Librixer dry corn fractionation can be summarized as follows:

Fraction 1:
Bran, "Fly wings" very large sheets of fiber with very low bulk density, ready for separation in an air fluidized vacuum supported bed.

Fraction 2:
Germ, slightly less dense material when compared with the hard endosperm in a very tight particle size distribution curve, can be separated via a standard gravity shaker table or similar known art based on a combination of particle size and their specific density.

Fraction 3:
Soft endosperm is at the same time micronized and liberated into a very fine flour with all particles significantly smaller than the other 3 fractions. Successful screening on a shaker screen will separate and remove these small starch granules together with their even finer liberated protein structures.

Fraction 4:
The hard endosperm is significantly larger but most not as large as the germ and therefore can be separated from the germ based on size and specific density on a screen shaker table equipped with a simple air aspirator.

It has been shown during field trials and other tests that corn fractions do not pick up significant electric charges during micronization and liberation or the handling thereafter. This opens separation of the different components via many different known art. It is observed how well the liberated material flow at its normal safe moisture level. It should also be noted that the added surface moisture of the bran has been removed during the process inside the Librixer.

FIG. 1 is a schematic block diagram of the proposed technique including feed stock tempering, the Librixer corn and other cereal component liberation and micronization process controlled by certain set parameters such as:

Tempering of the feed. The methods disclosed herein include use of either analyte or tap water for a quick efficient moisturizing of the bran fiber. The analyte water clusters are smaller and therefore have the ability to penetrate the bran fiber structures more quickly without unnecessary wetting of the actual feed stock beyond the thin bran layer. The analyte water also adds additional process security based on its well proven ability to sterilize surfaces from bacteria, viruses, and mold.

The tempering may be fine-tuned for different variety of feed stock and process conditions. The character of the bran and its thickness together with product start moisture level and local ambient process conditions may be considered for an optimization of the bran tempering step.

Feed rate is established by the rotation speed setting of the grain screw. Significant volume trials have shown typical feed rate ranges from 0.5 liters to upwards 2 liters per second for corn cereals. With the specific density for corn, this can be converted to a preferred feed rate of 1.5 tons to 4 tons per hour for a standard sized Librixer with a process chamber diameter of about 530 mm. Larger sized Librixer units can be expected to have a higher capacity. Large ethanol plants may consume up to 200 tons of corn stock per hour, which would require several Librixer units in a parallel configuration It is important that the feed into the Librixer is done un-restrained with ability for the equipment to freely add necessary process air as need by the system. The Librixer ability to and preference for adding additional air do result in an optimum process environment generating predictable and chaotic forces as the material and its brittle and flexible components are moved in a non-linear fashion through the Librixer.

As the processed material exit the Librixer it is a good concept of using a common Air Aspirator or similar technology for separation of the bran. Starting with the bran is practical and recommended prior to traditional sieve screening of the remaining components into different fractions based on size, followed by further density separation of similar sized particles within each size fraction.

The general operating parameters of the Librixer promotes not only micronization but also liberation along natural boundaries. A typical requirement, well known to people in the industry is to set available processing parameters to generate maximum sized result material, should the process equipment allow such control and consideration.

The Librixers predictable and chaotic process environment and functionality is specifically suitable and designed for such consideration and settings. Complete liberation along natural boundaries between components at maximum sized particles result in significantly less complicated, less costly with higher throughput known separation and concentration of the different components. Larger particles tend to be easier to separate using an optimized known separation technology. Trials have shown consistently that liberated and micronized materials processed in the Librixer are less complicated to separate and concentrate of this very reason of cleavage along natural boundaries.

All liberation of the different components is accomplished during one pass through the Librixer. The down-stream separations into different fractions may preferably be accomplished in several steps based on the different characteristics of the liberated combined result as follows:

The bran is preferably separated and concentrated very early in the aft-process, due to its sheer volume and ease. Bran can be separated, by one or more of the known systems based on weight and large surface area giving these fibers unique flying characteristics in for instance an air aspirator based process step, either as a stand along or possibly a combined with other separation steps such as a fluidized density shaker table. This single or combination fiber concentration step would result in a new very clean fiber fraction, "Result Product Bran Large" as indicated in FIG. 1.

The Fluffy endosperm, recognizable by its white color, consists of very small starch granules, before liberation held together with protein. One quick pass through the Librixer takes this entire fluffy endosperm structure apart and micronized down to a very fine powder consisted of starch granules and broken protein structures that used to contain the starch granules. The fluffy endosperm powder flow very uniform and can for instance be concentrated by its small size in a standard traditional shaker screen system creating the second clean concentrated fraction "Fluffy Endosperm Flour" as indicated in FIG. 1.

The remaining combined fractions; Hard Endosperm and Germ have a significant density difference that can be used for creating the two final fractions consisting of either germ or hard endosperm. The actual density difference is not enough to allow for large variations in sizes within this combined fraction. It is therefore recommended that this combined material stream is split into 2 or more smaller fractions based on size first, as indicated in FIG. 1. In FIG. 1, as an illustration, this is done into 2 fractions consisting of one medium sized fraction and one additional large sized fraction, when compared with the fluffy endosperm fraction that is significantly smaller in size.

This size separation is preferably done in one combined separation step. Since the Librixer, with high degree of success, have liberated these three components along natural boundaries, such size separation into 3 or more sizes can successfully be accomplished with well-known existing equipment, such as a shaker screen equipped with a number of proper sized screens in a set-up allowing such system to become operational under optimum conditions assisted by for instance vacuum and rings or beads. Hard endosperm and germ must first be size classified before they can be separated based on density on a density table or with the help of certain air separators. FIG. 1 show such size separation into 2 fractions; One large and one Medium, where the large fraction has shown to hold larger pieces of the hard endosperm and fully whole mature germ. Tests have shown that the medium size fraction consists of very much the same, where obvious the hard endosperm is smaller as well as the germ being smaller or in some cases broken in half or ⅓'ds.

After density separation of the two or more size separated fractions consisting of hard endosperm and germ, the result is two or more pure fractions of germ and hard endosperm as shown in FIG. 1.

FIGS. 2 through 5 illustrate examples of further downstream processing steps associated with ethanol production utilizing the Librixers unique pre-process fractionation as described in detail above.

Figure 2:
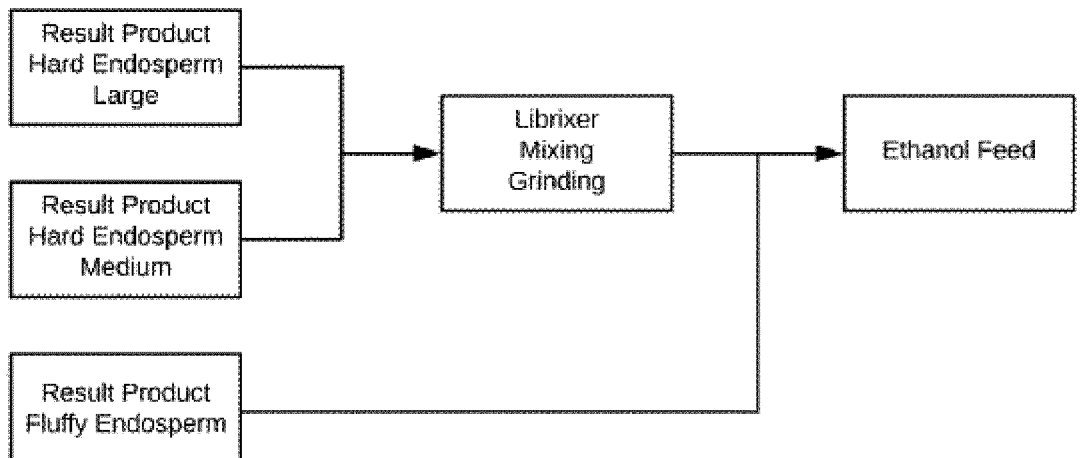
FIG. 2 is a schematic block diagram of a process and apparatus for endosperm mixing and grinding, resulting in product feed stock for ethanol production or other concentrated starch use of a super mash consisting of liberated and concentrated endosperm.

FIG. 2 shows the process steps associated with creation of a super-mash feed consisting of close to a 100% starch feed where both the germ, tip cap and the bran has been removed. The Librixer is here working both as a "micronizer" and a mixer/harmonizer of the two kinds of endosperm. Studies have shown that by removing the two inert fractions, bran (about 11%) and germ (about 6%) respectively, a significant higher sucrose content is possible for the same volume of mash but with a significant higher volume of dry substance without process problems. Traditional dry milling techniques may result in a mash including not only starch but also significant volume of "inert" materials such as bran and germ, which may constitute around 34-36% dry matter by weight in the mash. Higher dry material content is not possible due to mechanical limitations in the mash caused by the presence of bran and germ. When the bran and germ is removed such dry content of starch can be significantly increased and after the enzymatic starch break down and conversion to sucrose from such super mash an expected yield increase in sucrose level has been noted to well over 45%. This represent over 25% increase in performance at no or insignificant change in operating cost! Obviously, such significant yield increase does require adding both additional starch feed stock in the form of Librixer super mash and ability for the fermentation and distillation systems to handle such increased sucrose levels. It is possible that this significant yield increase can be accomplished within the improved enzyme operating environment created by removal of both fat and fibers. It is known within the industry, that presence of fat and fibers severely limits the performance and frequently kills off these enzymes.

Figure 3:
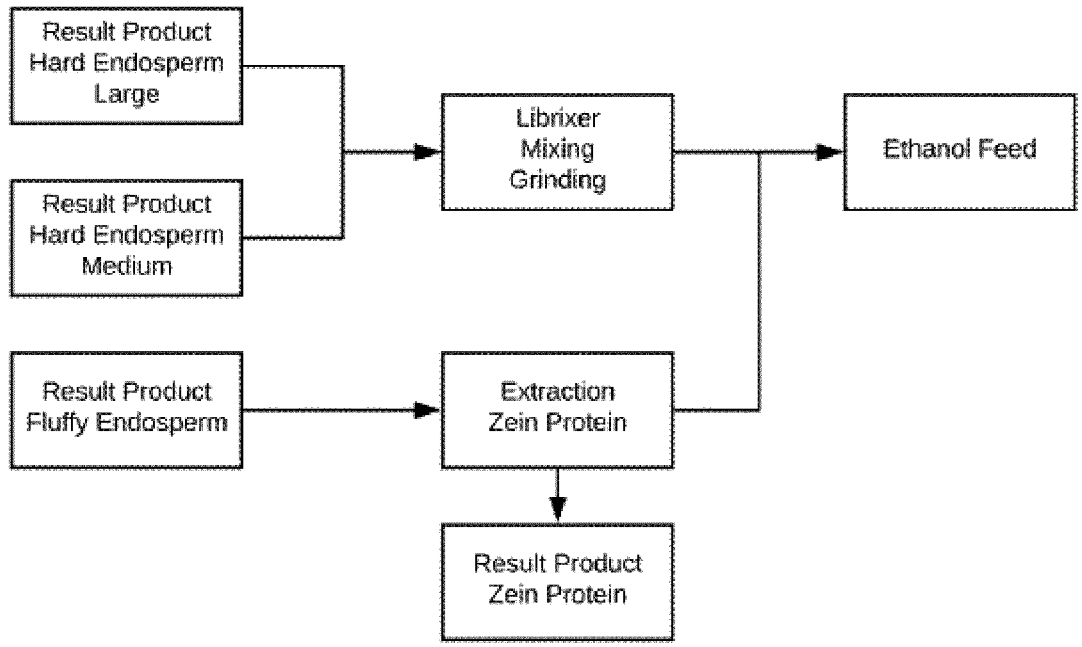
FIG. 3 is a schematic block diagram of a process and apparatus for endosperm mixing and grinding, resulting in product feed stock for ethanol production after Zein protein extraction.

FIG. 3 show an interesting ability of the method of corn fractionation via liberation and micronization in the Librixer specifically addressing extraction of the valuable Zein protein that earlier has been liberated during the micronization of the fluffy endosperm. The total volume of the different varieties of Zein is approximately 3% of the total weight of the kernel. The Zein protein is not consumed by the ethanol process and will eventually end up in the spent grain sold as animal feed as a part of the nutritional value. By pre-fractionation, separation, and extraction of Zein its value can be increased between 200 and 1,000 times and instead of being a nuisance and a general hindrance in a low profitable ethanol production, Zein extraction might become the most profitable phase of the Ethanol production when compared with the ethanol value.

The Librixer liberated and in known technology separated fluffy endosperm is perfectly situated in an ethanol plant for Zein protein extraction as shown in FIG. 3. The liberated and micronized fluffy endosperm with its mechanically liberated protein have both become very reactive during the Librixer fractionation process. The different Zein protein variations are, as reported in other publication, all soluble in alcohol with different strengths. An ethanol plant with its own alcohol production is an optimized opportunity for liberation and extraction of Zein proteins. Ethanol, being a polar solvent, is readily mixed with water to specific strength. It is furthermore safe for human consumption and already a part of the business. Using alcohol at different concentration enables convenient Zein isolates of at least four major fractions within the Zein storage protein: α-Zein, β-Zein, γ-Zein, and δ-Zein. There are several prior art presentations describing the general benefits and specific application for these different proteins. One such important application, known for long time, is coating of medications tablets in the pharmaceutical industry. The digestible, waterproof, renewable Zein coatings and moisture barriers can be expected to a dramatic increase in the future replacing existing non-renewable petroleum-based alternatives. One such application is to replace the moisture barrier in all paper containers and finally make all these from renewable sources or sourced from low value waste from the ethanol industry.

Figure 4:
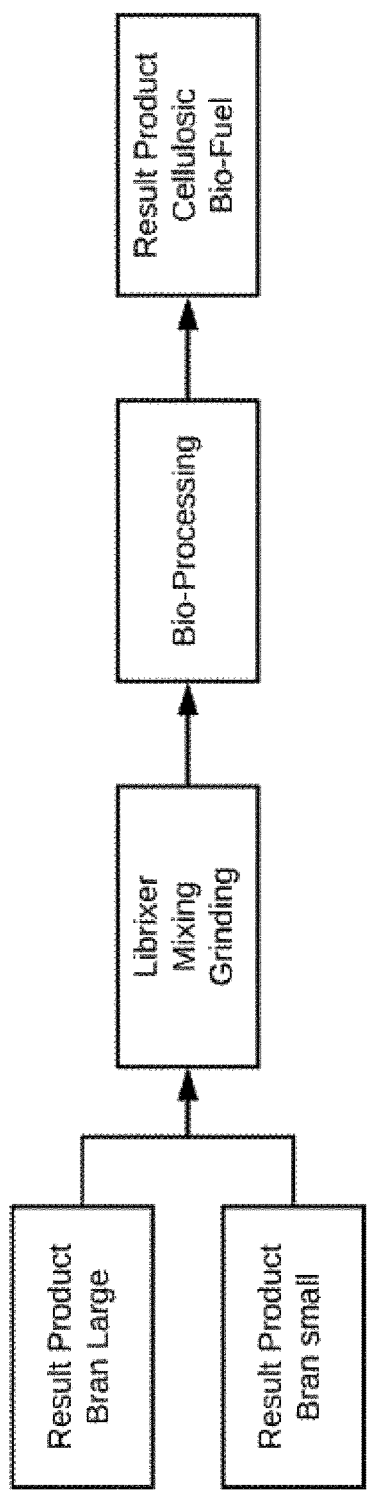
FIG. 4 is a schematic block diagram of a process and apparatus for bran mixing and grinding for bio-processing of cellulosic fibers suitable for production of, e.g., highly subsidized fiber based bio-fuels.

A shown in FIG. 4, the cellulose in the bran can with specific enzymes also be converted into sucrose and additional ethanol be produced with bran as a basis. The starch to sucrose and cellulose to sucrose conversions are not possible simultaneously in the same batch. The liberation in the Librixer and separation by known technologies of the bran opens possibilities for additional sucrose conversion side by side with the existing starch conversion and then combine these for final distillation.

Figure 5:
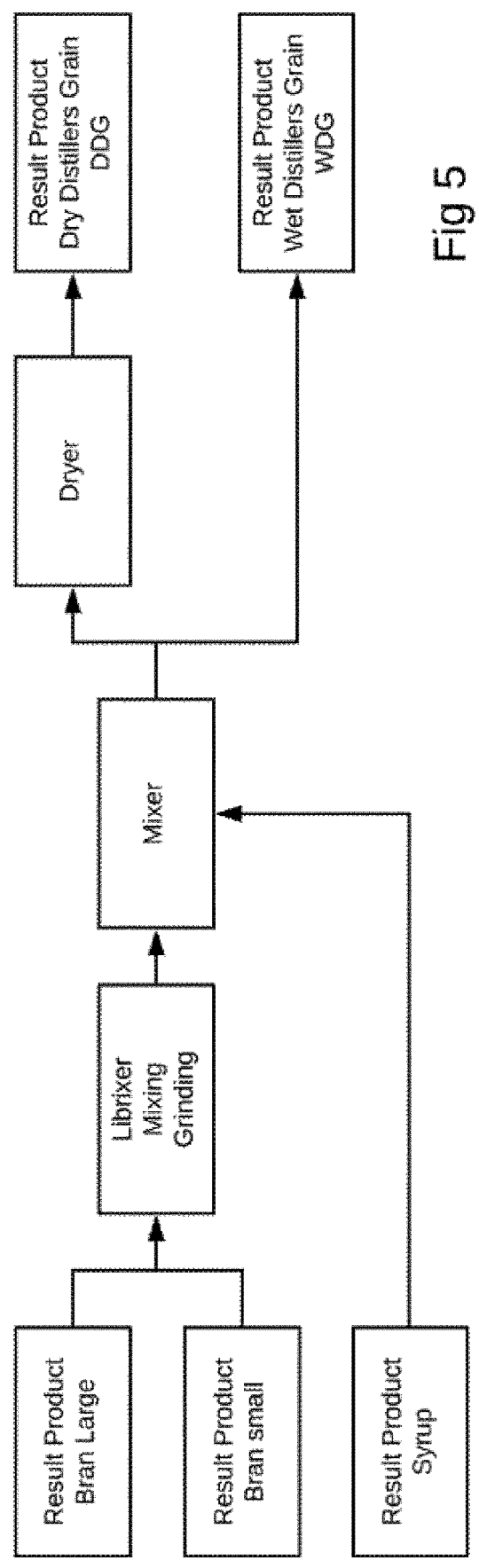
FIG. 5 is a schematic block diagram of a process and apparatus for bran mixing and grinding with addition of syrup, commonly available on-site, as a nutritional binding agent for creating higher value DDG or WDG (Dry or Wet Distiller's Grain, respectively) suitable for local or long distance feed markets.

FIG. 5 shows a process flow where the separated dry bran is gently micronized in the Librixer before being mixed with low value ethanol bi-product syrup. The syrup is a low nutritional liquid extract as a bi-product from later stages in traditional ethanol productions. Tests have showed that such micronized bran can hold many times its own weight in liquid. Mixing the low value syrup with the rich nutritional bran fibers will several times multiply the value of the syrup before it is put back together with other nutritional byproducts from the process to become either dry, after dehydration, or wet distillers' grain. Such DDG or WDG is commonly used for animal feed either locally as wet, or if needed, further distance from the ethanol plant in a dry form more suitable for longer transportation. Proper liberated and further grind in the Librixer bran can hold as much as seven times its own weight in liquid.

FIG. 6A is a schematic block diagram illustrating the general operating principles behind an example of the Librixer system 600A discussed herein. As described in prior art by the inventor: A mixture of source product and air enters the Librixer Entrance opening at AX. In first upper of 3 or more vertical process chambers. The mix is spun outwards and will create a circular product material curtain restrained by the flat walls. The material curtain spins either clockwise or counterclockwise direction initiated by the vertical rotor assembly consisting of as many rotors as there are process chambers. The material flow is restrained by an odd number of flat wall segments, not shown in the schematic drawing. In each apex corner between two flat walls segment a vortex generator is placed setting up two counter to the main flow small vortexes. The main material flow curtain interacts with these smaller vortexes consisting of a fluid, most commonly air, and material in such way that brittle materials are stressed apart along natural boundaries. More flexible materials or fractions of a material, such as fibers, tend to go through relatively unharmed. There are two outlets for the Librixer. The air mixed with finer particles are directed upwards, into a baghouse via air duct BX while all other particles are collected and released through an airtight valve at the bottom of the discharge cone at CX.

The horizontal view in FIG. 6A show one such rotor wheel. For simplicity, all rotor vanes are straight in that image. The described material curtain is established as a circular boundary just inside an inscribed circle created by the inner parts of the apex corner placed vortex generators. These are for clarity just indicated with an oval formed member. As the material curtain restrained by the process chamber walls reach a vortex generator a portion of the fluid stream is folded back on itself created a small counter (to the main curtain rotation direction) rotating vortex. The Coanda effect drag part of the initial vortex fluid over to the back side of the generator, creating a second slightly weaker vortex on the back side of the generator. These two small vortexes are indicated by two small bent arrows in FIG. 6A. For clarity only two such vortexes are indicated, but each generator sets up its own two vortexes. These generators may have different shapes from the Greek letter omega to a shape similar to two spoons placed "back to back" and many others optimizing the performance to different materials.

The chaotic interference between these small counterrotating vortexes and the main material flor curtain is one key component in the liberation function of the Librixer system. Each vortex is influenced by the lower pressure in the process chamber below. As the particles are getting liberated and less dense or smaller and specific gravity decreased, they eventually are sucked down into the next chamber where the process is repeated in a similar fashion until the very last chamber.

FIG. 6B shows an apparatus 600B similar to that discussed in connection to FIG. 6A, having a similar function and similar capabilities. The apparatuses 600A and 600B are arranged to perform at least some of the methods discussed herein.

FIG. 7 is a flow chart illustrating methods which summarize the processes discussed above in connection to FIGS. 1-6. In particular, the flow chart illustrates a dry, one pass processing method for obtaining pre-processing liberated fractions from a corn or other cereal kernel. The method comprises moisturizing S1 the corn bran layer by a mist of droplets of water, and also comminuting S2 the corn kernel by a comminution reactor 610 comprising a spinnable shaft 681 and two or more processing chambers 682, separated by segmented plates 683, wherein each processing chamber 682 comprises a rotor disc 684 attached to the shaft 681 and one or more vortex generators 685 placed in a side wall 686 apex corner of the processing chambers 682, wherein the corn kernel is fed into the comminution reactor 610 and small and large bran sections, whole and broken germ, soft endosperm flour, and medium and large hard endosperm particles are liberated from the corn kernel by means of a chaotic vortex flow of the corn kernel and the liberated products generated in the processing chambers 682.

According to aspects, the method further comprises separating S3 the bran from the liberated products using an air aspirator.

According to aspects, the method further comprises dividing S4 the remaining liberated components, after the separation S3 of the bran, into large size, medium size, and fine particles based on their relative size.

According to aspects, the dividing S4 is achieved with a sieve screen or a shaker screen.

According to aspects, the medium sized hard endosperm and small or broken germ are separated S41 from each other based on their density.

According to aspects, small sized bran pieces and the tip caps are separated S42 from the large hard endosperm and whole germ by an air aspirator.

According to aspects, the separated large hard endosperm and whole germ are separated S41 from each other based on their density.

According to aspects, the method further comprises a mixing for a high starch content mash where the small and large bran flakes, and the whole and broken germ have been removed, the mixing comprising grinding S51 the separated medium sized hard endosperm, the large sized hard endosperm, and the soft endosperm together in the comminution reactor 610 into the high starch content mash of suitable size for enzymatic conversion of starch to sucrose.

According to aspects, Zein protein is dissolved and extracted S511 from the soft endosperm before re-mixing of all starch bearing endosperm fractions.

According to aspects, the method further comprises a mixing for a high cellulose content flour where the whole and broken germ, soft endosperm, and medium and large hard endosperm have been removed, the mixing comprising grinding S52 the separated small bran and large bran together in the comminution reactor 610 into the high cellulose content flour.

According to aspects, the starch in the high starch content mash is converted S61 into sucrose using enzymes for starch to sucrose conversion.

According to aspects, the cellulose in the high cellulose content flour is converted S62 into sucrose using enzymes for cellulose to sucrose conversion.

According to aspects, the method further comprises converting S7 the high starch content mash into ethanol.

According to aspects, the converted high cellulose content flour is converted S7 into ethanol.

According to aspects, the converted high starch content mash and the converted high cellulose content flour are combined and converted into sucrose, fermented and distilled S7 into ethanol.

According to aspects, the method further comprises a mixing for a spent grain feed, the mixing comprising grinding S53 the separated small bran and large bran together with a syrup extracted as a by-product from later stages in ethanol production, and together with spent grain in the comminution reactor 610 into the spent grain feed stock.

Figure 8:
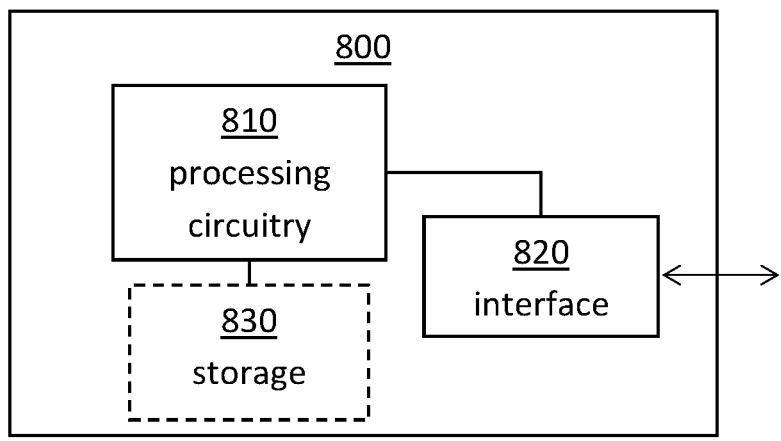
FIG. 8 schematically illustrates a control unit.

FIG. 8 schematically illustrates, in terms of a number of functional units, the general components of a control unit 800. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the Librixer system to perform a set of operations, or steps, such as the methods discussed in connection to FIG. 7 and the discussions above, and also to set the operating parameters of the Librixer system according to the discussions above. For example, the storage medium 830 may store the set of operations, and the processing circuitry 810 may be configured to retrieve the set of operations from the storage medium 830 to cause the device to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory. This storage medium may be configured to store one or more sets of configuration settings for the Librixer system.

The device 800 may further comprise an interface 820 for communications with at least one external device. As such the interface 820 may comprise one or more transmitters and receivers, comprising analogue and digital components and a suitable number of ports for wireline or wireless communication.

The processing circuitry 810 controls the general operation of the control unit 800, e.g., by sending data and control signals to the interface 820 and the storage medium 830, by receiving data and reports from the interface 820, and by retrieving data and instructions from the storage medium 830.

Figure 9:
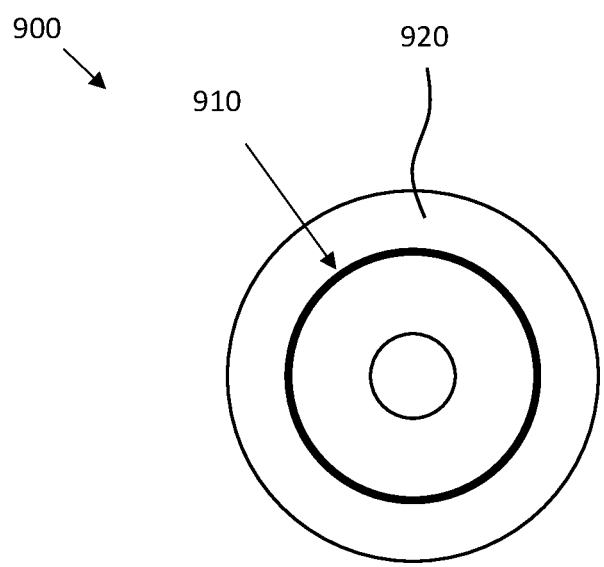
FIG. 9 illustrates a computer program product.

FIG. 9 illustrates a computer readable medium 910 carrying a computer program comprising program code means 920 for performing the methods illustrated in FIG. 7 and/or for executing the various functions discussed above, when said program product is run on a computer. The computer readable medium and the code means may together form a computer program product 900. This computer program product may comprise one or more sets of configurations for controlling the Librixer system discussed above to perform the methods disclosed herein.

The invention claimed is:

1. A dry, one pass processing method for obtaining pre-processing liberated fractions from cereal kernels, the method comprising:
    moisturizing (S1) bran layers of the kernels by a mist of droplets of water,
    comminuting (S2) the kernels utilizing by a comminution reactor (610) comprising a spinnable shaft (681) and two or more processing chambers (682), separated by segmented plates (683), wherein each processing chamber (682) comprises a rotor disc (684) attached to the shaft (681) and one or more vortex generators (685) placed in a side wall (686) apex corner of the processing chambers (682),
    wherein the kernels are fed into the comminution reactor (610) and small bran particles and large bran particles, whole germ, small germ and broken germ, soft endosperm flour, and medium and large hard endosperm particles are liberated from the kernels by means of a chaotic vortex flow of the kernels, forming liberated products in the processing chambers (682),
    removing the small bran particles and the large bran particles;
    removing the small germ, the whole germ, and the broken germ;
    grinding (S51) the medium hard endosperm particles, the large hard endosperm particles, and the soft endosperm flour together in the comminution reactor (610), forming a high starch content mash of suitable size for enzymatic conversion of starch to sucrose.

2. The method according claim 1, further comprising the step of separating (S3) the large bran particles from the liberated products using an air aspirator leaving remaining liberated products.

3. The method according to claim 2, further comprising the step of, dividing (S4) the remaining liberated products into large size, medium size, and fine particles based on relative size of the liberated products.

4. The method according to claim 3, wherein the dividing step (S4) is achieved with a sieve screen or a shaker screen.

5. The method according to claim 3, wherein the relative size is selected such that the fine particles comprise the soft endosperm flour.

6. The method according to claim 5, wherein the relative size is selected such that the medium size particles comprise the medium hard endosperm particles, the broken germ, and the small germ.

7. The method according to claim 6, wherein the relative size is selected such that the large size particles comprise the large hard endosperm particles and the whole germ.

8. The method according to claim 6, wherein the medium hard endosperm particles are separated (S41) from the small germ and the broken germ based on their density.

9. The method according to claim 7, wherein small bran particles and tip caps are separated (S42) from the large hard endosperm particles and the whole germ by an air aspirator.

10. The method according to claim 9, wherein the separated large hard endosperm particles and the whole germ are separated (S41) from each other based on their density.

11. The method according to claim 1, wherein the water is either tap water or analyte water.

12. The method according to claim 1, wherein the moisturizing (S1) of the kernels is occurrent for 10-30 seconds.

13. The method according to claim 1, wherein zein protein is dissolved and extracted (S511) from the soft endosperm flour before the grinding step.

14. The method according to claim 1, further comprising the steps of:
    removing the whole germ, the broken germ, the soft endosperm flour, the medium hard endosperm particles, and the large hard endosperm particles;
    grinding (S52) the small bran and the large bran together in the comminution reactor (610) to form high cellulose content mash.

15. A dry, one pass processing method for obtaining pre-processing liberated fractions from cereal kernels, the method comprising:
    moisturizing (S1) bran layers of the kernels by a mist of droplets of water,
    comminuting (S2) the kernels by a comminution reactor (610) comprising a spinnable shaft (681) and two or more processing chambers (682), separated by segmented plates (683), wherein each processing chamber (682) comprises a rotor disc (684) attached to the shaft (681) and one or more vortex generators (685) placed in a side wall (686) apex corner of the processing chambers (682), and
    wherein the kernels are fed into the comminution reactor (610) and small and large bran particles, whole germ, small germ and broken germ, soft endosperm flour, and medium and large hard endosperm particles are liberated from the kernels by means of a chaotic vortex flow of the kernels, forming liberated products in the processing chambers (682),
    grinding (S51) medium hard endosperm particles, large hard endosperm particles, and soft endosperm flour together in the comminution reactor (610), forming a high starch content mash,
    wherein starch in the high starch content mash is converted (S61) into sucrose using enzymes for starch to sucrose conversion.

16. The method according to claim 14, wherein the cellulose in the high cellulose content mash is converted (S62) into sucrose using enzymes for cellulose to sucrose conversion.

17. The method according to claim 15, wherein the converted high starch content mash after sucrose conversion is fermented (S7) into ethanol.

18. The method according to claim 16, wherein the converted high cellulose content flour after sucrose conversion is fermented and converted (S7) into ethanol.

19. The method according to claim 1, further comprising the steps of:
grinding (S53) the small bran and the large bran together with a syrup, and adding spent grain in the comminution reactor (610) to form spent grain mash.

20. The method according to claim 1, wherein the comminution reactor (610) comprises between 2 and 10 processing chambers (682).

21. The method according to claim 1, wherein the size of each processing chamber (682) and its respective rotor disc (684) is between 13-38 inches.

22. The method according to claim 1, wherein the processing chamber (682) comprises up to 9 vortex generators (685).

23. The method according to claim 1, wherein the rotor disc (684) rotates at 1550 revolutions per minute.

24. The method according to claim 1, wherein a feed rate of kernels into the comminution reactor (610) is between 1 and 5 metric tons of kernels per hour.

* * * * *